(12) United States Patent
Wang et al.

(10) Patent No.: US 12,197,037 B2
(45) Date of Patent: Jan. 14, 2025

(54) IMAGING LENS SYSTEM, CAMERA MODULE AND ELECTRONIC DEVICE

(71) Applicant: JIANGXI LIANYI OPTICS CO., LTD., Nanchang (CN)

(72) Inventors: Yilong Wang, Nanchang (CN); Xuming Liu, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 510 days.

(21) Appl. No.: 17/558,503

(22) Filed: Dec. 21, 2021

(65) Prior Publication Data

US 2022/0113495 A1 Apr. 14, 2022

Related U.S. Application Data

(63) Continuation-in-part of application No. PCT/CN2020/077782, filed on Mar. 4, 2020.

(30) Foreign Application Priority Data

Jun. 24, 2019 (CN) .......................... 201910546646.2

(51) Int. Cl.
*G02B 9/58* (2006.01)
*G02B 3/04* (2006.01)
*G02B 13/00* (2006.01)

(52) U.S. Cl.
CPC ................ *G02B 9/58* (2013.01); *G02B 3/04* (2013.01); *G02B 13/004* (2013.01)

(58) Field of Classification Search
CPC ... G02B 9/34; G02B 9/36; G02B 9/58; G02B 13/004
See application file for complete search history.

(56) References Cited

U.S. PATENT DOCUMENTS

2015/0085382 A1* 3/2015 Choi ...................... G02B 13/04
    359/782
2019/0121059 A1* 4/2019 Huang ................. G02B 13/004
(Continued)

FOREIGN PATENT DOCUMENTS

CN        107422459 A     12/2017
CN        207020387 U     2/2018
(Continued)

OTHER PUBLICATIONS

SIPO, First Office Action for CN Application No. 201910546646.2, Mar. 13, 2020.

(Continued)

*Primary Examiner* — Ephrem Z Mebrahtu

(57) ABSTRACT

Provided are an imaging lens system, a camera module and an electronic device. The imaging lens system, from an object side to an imaging plane, sequentially includes: a first lens with a negative focal power, a second lens with a positive focal power, a third lens with a positive focal power and a fourth lens with a negative focal power. An object side surface of the first lens includes a paraxial region and a peripheral region. In the object side surface of the first lens, at least one inflection point is defined between the paraxial region and the peripheral region, and the paraxial region is concave relative to the at least one inflection point. An image side surface of the third lens is convex. A paraxial region of an image side surface of the fourth lens is concave.

20 Claims, 14 Drawing Sheets

(56) References Cited

U.S. PATENT DOCUMENTS

2020/0310082 A1* 10/2020 Tseng .................. G02B 9/58
2022/0066139 A1* 3/2022 Zhang .................. G02B 9/58

FOREIGN PATENT DOCUMENTS

| | | |
|---|---|---|
| CN | 207123647 U | 3/2018 |
| CN | 207336900 U | 5/2018 |
| CN | 208459670 U | 2/2019 |
| CN | 109683291 A | 4/2019 |
| JP | 2013007968 A | 1/2013 |
| JP | 2017037276 A | 2/2017 |
| JP | 2017116795 A | 6/2017 |
| KR | 20130119307 A | 10/2013 |

OTHER PUBLICATIONS

Decision to grant patent from China patent office in a counterpart Chinese patent Application 201910546646.2, Mailed Oct. 29, 2020.
WIPO, Written opinion of the International Search Authority for PCT Application No. PCT/CN2020/077782, May 28, 2020.
WIPO, International Search Report for PCT Application No. PCT/CN2020/077782, May 28, 2020.

* cited by examiner

IMAGING LENS SYSTEM, CAMERA MODULE AND ELECTRONIC DEVICE

CROSS-REFERENCE TO RELATED APPLICATION

This application is a continuation-in-part of an international application NO. PCT/CN2020/077782 filed on Mar. 4, 2020. This international application NO. PCT/CN2020/077782 claims priority to a CN application No. 2019105466462 filed on Jun. 24, 2019. The entirety of the above-mentioned applications is hereby incorporated by reference for all purposes.

TECHNICAL FIELD

The disclosure relates to the technical field of optical imaging, and particularly to an imaging lens system, a camera module and an electronic device.

BACKGROUND

Lens is an important part of the optical imaging system, which is one of the standard components of the current cell phones, tablets, security monitoring equipment, driving recorders and other terminals. In recent years, with the continuous development of mobile information technology, the demand for terminals is increasing, meanwhile, the number of lenses disposed on terminals is also increasing.

With the user's enthusiasm for thinness and lightness terminals and the pursuit of superior imaging performance, there is a requirement for the imaging lens system to meet both miniaturization and wide field of view. However, in the prior art, the imaging lens system in the current market cannot achieve a balance of miniaturization and wide field of view well, which results in the realization of lens miniaturization with the sacrifice of field of view, or the realization of wide field of view with the defect of large volume.

SUMMARY

According to an embodiment of the disclosure, the imaging lens system, from an object side to an imaging plane, sequentially includes: a first lens, where the first lens has a negative focal power, and an object side surface of the first lens includes a first paraxial region and a first peripheral region; in the object side surface of the first lens, at least one inflection point is defined between the paraxial region and the peripheral region, and the paraxial region is concave relative to the at least one inflection point; a second lens, where the second lens has a positive focal power; a third lens, where the third lens has a positive focal power, and an image side surface of the third lens is convex; and a fourth lens, where the fourth lens has a negative focal power, and a paraxial region of an image side surface of the fourth lens is concave.

According to another embodiment of the disclosure, a camera module, includes an imaging lens system and an image sensor opposite to the imaging lens system. The imaging lens system, from an object side to an imaging side, includes: a first lens, where an image side surface of the first lens is concave and an object side surface of the first lens includes a paraxial region and a peripheral region; in the object side surface of the first lens, at least one inflection point is defined between the paraxial region and the peripheral region, and the paraxial region is concave relative to the at least one inflection point; a second lens, where the second lens has a positive focal power; a third lens, where the third lens has a positive focal power, and an image side surface of the third lens is convex; and a fourth lens, where the fourth lens has a negative focal power, and a paraxial region of an image side surface of the fourth lens is concave, and an object side surface of the fourth lens comprises a paraxial region and a peripheral region; where in the object side surface of the fourth lens, at least one inflection point is defined between the paraxial region and the peripheral region, the paraxial region is convex relative to the at least one inflection point, and the second peripheral region is concave to the object side. The imaging lens system meets the following expression: $0.3 \leq (SAG_{11}-SAG_{12})/(SAG_{42}-SAG_{41}) \leq 0.7$; where $SAG_{11}$ represents a sagittal depth of the object side surface of the first lens, $SAG_{12}$ represents a sagittal depth of an image side surface of the first lens, $SAG_{41}$ represents a sagittal depth of an object side surface of the fourth lens, and $SAG_{42}$ represents a sagittal depth of the image side surface of the fourth lens.

According to still an embodiment of the disclosure, an electronic device includes a camera module, a memory and a processor. The memory and the camera module are electrically connected with the processor, and the memory is configured to store image data. The processor is configured to process the image data. The camera module includes an imaging lens system and an image sensor, and the image sensor is opposite to the imaging lens system and configured to sense and generate the image data. The imaging lens system, from an object side to an imaging side, sequentially includes: a first lens, where the first lens has a negative focal power, an image side surface of the first lens is concave and an object side surface of the first lens includes a paraxial region and a peripheral region; in the object side surface of the first lens, at least one inflection point is defined between the paraxial region and the peripheral region, and the paraxial region is concave relative to the at least one inflection point; a second lens, where the second lens has a positive focal power; a third lens, where the third lens has a positive focal power, and an image side surface of the third lens is convex; and a fourth lens, where the fourth lens has a negative focal power, and a paraxial region of an image side surface of the fourth lens is concave, and an object side surface of the fourth lens comprises a paraxial region and a peripheral region; where in the object side surface of the fourth lens, at least one inflection point is defined between the paraxial region and the peripheral region, the paraxial region is convex relative to the at least one inflection point, and the second peripheral region is concave to the object side. The imaging lens system meets the following expression: $-0.43 \text{ mm} \leq SAG_{22}-SAG_{21} \leq 0.21 \text{ mm}$; where $SAG_{22}$ represents a sagittal depth of an image side surface of the second lens, and $SAG_{21}$ represents a sagittal depth of an object side surface of the second lens.

BRIEF DESCRIPTION OF THE DRAWINGS

FIG. 1a-2 illustrates a schematic structural diagram of a first lens of an imaging lens system as illustrated in FIG. 1a-1, according to an embodiment of the disclosure;

FIG. 1a-3 illustrates a schematic structural diagram of a third lens of an imaging lens system as illustrated in FIG. 1a-1, according to an embodiment of the disclosure;

FIG. 1a-4 illustrates a schematic structural diagram of a fourth lens of an imaging lens system as illustrated in FIG. 1a-1, according to an embodiment of the disclosure;

FIG. 2a-1 is a schematic structural diagram of an imaging lens system according to a second embodiment of the disclosure;

FIG. 2a-2 illustrates a schematic structural diagram of a first lens of an imaging lens system as illustrated in FIG. 2a-1, according to an embodiment of the disclosure;

FIG. 2a-3 illustrates a schematic structural diagram of a fourth lens of an imaging lens system as illustrated in FIG. 2a-1, according to an embodiment of the disclosure;

FIG. 3a-1 is a schematic structural diagram of an imaging lens system according to a third embodiment of the disclosure;

FIG. 3a-2 illustrates a schematic structural diagram of a first lens of an imaging lens system as illustrated in FIG. 3a-1, according to an embodiment of the disclosure;

FIG. 3a-3 illustrates a schematic structural diagram of a fourth lens of an imaging lens system as illustrated in FIG. 3a-1, according to an embodiment of the disclosure;

FIG. 4a-1 is a schematic structural diagram of an imaging lens system according to a fourth embodiment of the disclosure;

FIG. 4a-2 illustrates a schematic structural diagram of a first lens of an imaging lens system as illustrated in FIG. 4a-1, according to an embodiment of the disclosure;

FIG. 4a-3 illustrates a schematic structural diagram of a third lens of an imaging lens system as illustrated in FIG. 4a-1, according to an embodiment of the disclosure;

FIG. 4a-4 illustrates a schematic structural diagram of a fourth lens of an imaging lens system as illustrated in FIG. 4a-1, according to an embodiment of the disclosure;

REFERENCE NUMERALS OF MAIN COMPONENTS

Figures 1, 1A:
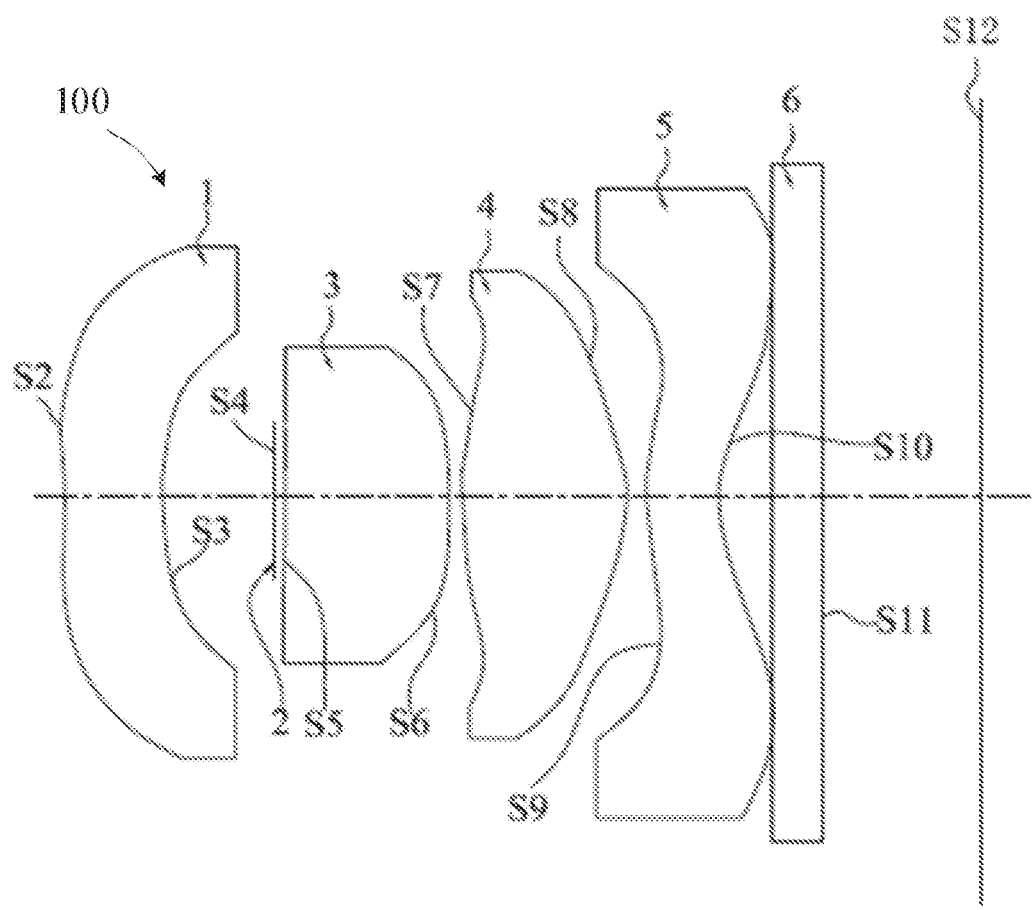
FIG. 1a-1 is a schematic structural diagram of an imaging lens system according to a first embodiment of the disclosure.

| First lens | 1 | Stop | 2 |
|---|---|---|---|
| Second lens | 3 | Third lens | 4 |
| Fourth lens | 5 | Infrared cut-off filter | 6 |
| Object side surface of the first lens | S2 | Image side surface of the first lens | S3 |
| Object side surface of the second lens | S5 | Image side surface of the second lens | S6 |
| Object side surface of the third lens | S7 | Image side surface of the third lens | S8 |
| Object side surface of the fourth lens | S9 | Image side surface of the fourth lens | S10 |
| Surface of the stop | S4 | Surface of the infrared cut-off filter | S11 |
| Imaging plane | S12 | | |

The following specific embodiments will further illustrate the disclosure with reference to the above accompanying drawings.

DETAILED DESCRIPTION OF PREFERRED EMBODIMENTS

In order to facilitate the understanding of the disclosure, the disclosure will be described completely hereinafter with reference to the accompanying drawings. Several embodiments of the disclosure are illustrated in the drawings. However, the disclosure may be implemented in many different manners and is not limited to the embodiments described herein. On the contrary, these embodiments are provided to make the disclosure more thorough and comprehensive.

Unless defined otherwise, all technical and scientific terms used herein have the same meaning as commonly understood by those skilled in the art belonging to the present disclosure. The terminology used herein in the description of the present disclosure is only for the purpose of describing specific embodiments, and is not intended to limit the present disclosure. The term "and/or" as used herein includes any and all combinations of one or more of the associated listed items.

Embodiment 1

FIG. 1a-1 illustrates an imaging lens system 100 provided in a first embodiment of the disclosure. From an object side to an imaging plane S12, the imaging lens system 100 sequentially includes: a first lens 1 with a negative focal power, a stop 2, a second lens 3 with a positive focal power, a third lens 4 with a positive focal power, a fourth lens 5 with a negative focal power and an infrared cut-off filter 6. The first lens 1 has an object side surface S2 and an image side surface S3. The second lens 3 has a convex object side surface S5 and a convex image side surface S6. The third lens 4 has an object side surface S7 and an image side surface S8. The fourth lens 5 has an object side surface S9 and an image side surface S10.

Figures 1, 1A, 2:
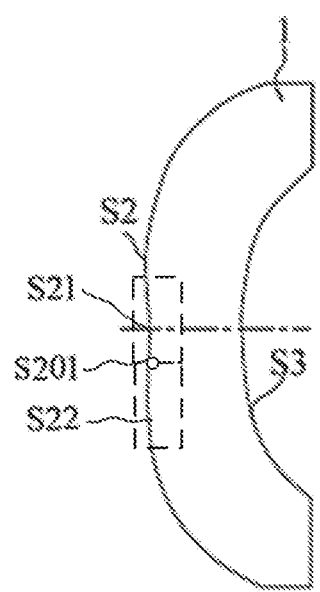

FIG. 1a-2 illustrates a schematic structural diagram of the first lens 1 of the imaging lens system as illustrated in FIG. 1a-1. The first fens 1 is a meniscus lens and both of the object side surface S2 and the image side surface S3 are curved surfaces. The object side surface S2 is substantially a convex surface and includes a paraxial region S21 and a peripheral region S22. At least one inflection point S201 is defined between the paraxial region S21 and the peripheral region S22 in the object side surface S2. Local curvature of the object side surface S2 crosses zero at the at least one inflection point S201 from the paraxial region S21 to the peripheral region S22. The paraxial region S21 is concave relative to the at least one inflection point S201. The peripheral region S22 is convex to the object side. The image side surface S3 is concave.

FIG. 1a-3 illustrates a schematic structural diagram of the third lens 4 of the imaging lens system as illustrated in FIG. 1a-1, according to an embodiment of the disclosure. Both of the object side surface S7 and the image side surface S8 of the third lens 4 are curved surfaces. The object side surface S7 includes a paraxial region S71 and a peripheral region S72, and at least one inflection point S701 is defined between the paraxial region S71 and the peripheral region S72 in the object side surface S7. Local curvature of the object side surface S7 crosses zero at the at least one inflection point S701 from the paraxial region S71 to the peripheral region S72. The paraxial region S71 is convex relative to the at least one inflection point S701. The peripheral region S72 is concave to the object side. The image side surface S8 is convex.

FIG. 1a-4 illustrates a schematic structural diagram of the fourth lens 5 of the imaging lens system as illustrated in FIG. 1a-1, according to an embodiment of the disclosure. Both of object side surface S9 and image side surface S10 of the fourth lens 5 are curved surfaces. The object side surface S9 includes a paraxial region S91 and a peripheral region S92, and at least one inflection point S901 is defined between the paraxial region S91 and the peripheral region S92 in the object side surface S9. Local curvature of the object side surface S9 crosses zero at the at least one inflection point S901 from the paraxial region S91 to the peripheral region S92. The paraxial region S91 is convex relative to the at least one inflection point S901. The peripheral region S92 is concave to the object side. The image side surface S10 includes a paraxial region S101 and a peripheral region S102, and at least one inflection point S1001 is defined between the paraxial region S101 and the peripheral region S102 in the image side surface S10. Local curvature of the image side surface S10 crosses zero at the at least one inflection point S1001 from the paraxial region S101 to the peripheral region S102. The paraxial region S101 is concave relative to the at least one inflection point S1001. The peripheral region S102 is convex to the image side.

In this embodiment, the first lens 1, the second lens 3, the third lens 4 and the fourth lens 5 are all aspherical lenses. The expression of aspherical surfaces of the aspherical lenses is:

$$z = \frac{ch^2}{1+\sqrt{1-(1+k)c^2h^2}} + Bh^4 + Ch^6 + Dh^8 + Eh^{10} + Fh^{12} + Gh^{14} + Hh^{16} + Lh^{18} + Jh^{20};$$

where z represents a vector height between a position on a surface and a vertex of the surface along an optical axis, c represents a curvature of the vertex of the surface, k represents a quadratic surface coefficient, h represents a distance between the optical axis and the position on the surface, B represents a fourth order surface coefficient, C represents a sixth order surface coefficient, D represents an eighth order surface coefficient, E represents a tenth order surface coefficient, F represents a twelfth order surface coefficient, G represents a fourteenth order surface coefficient, H represents a sixteenth order surface coefficient, L represents a eighteenth order surface coefficient, and J represents a twentieth order surface coefficient. Values of the parameters are shown hereinafter in the Table 1-2.

Further, the imaging lens system 100 meets the following expression:

$$-9 \leq f_1/f \leq -1.5; \qquad (1)$$

where f represents a focal length of the imaging lens system 100, and fj represents an effective focal length of the first lens 1. Satisfying the expression (1) can ensure that the first lens 1 has a relatively large negative focal power, lights with large field can be dispersed and enter into the system smoothly without a relatively large redirection, thereby ensuring that there is no need to correct large high-order aberrations of large field.

Further, the imaging lens system 100 meets the following expression:

$$-0.3 \leq f_3/f_2 \leq 1; \qquad (2)$$

where $f_2$ represents an effective focal length of the second lens 3, and $f_3$ represents an effective focal length of the third lens 4. Satisfying the expression (2) can appropriately design the focal powers of the lenses, so that every lens of the whole system has a relatively small and appropriate diameter, which facilitates the correction of aberrations.

Further, the imaging lens system 100 meets the following expression:

$$-0.3 \leq (SAG_{11} - SAG_{12})/(SAG_{42} - SAG_{41}) \leq 0.7; \qquad (3)$$

where $SAG_{11}$ represents a sagittal depth of the object side surface S2 of the first lens 1, $SAG_{12}$ represents a sagittal depth of the image side surface S3 of the first lens 1, $SAG_{41}$ represents a sagittal depth of the object side surface S9 of the fourth lens 5, and $SAG_{42}$ represents a sagittal depth of the image side surface S10 of the fourth lens 6. Satisfying the expression (3) can effectively shorten the total optical length of the system 100, thereby realizing the miniaturization of the system.

Further, the imaging lens system 100 meets the following expression:

$$Rdf_{0.7} \leq 22°; \qquad (4)$$

where $Rdf_{0.7}$ represents an angle at which lights of 0.7 field pass through the object side surface of the fourth lens, and 0.7 field represents 0.7 times of the maximum FOV. Satisfying the expression (4) can reduce energy value of ghost of the system on this surface in order of magnitude, so the ghost of the system can be well improved.

Further, the imaging lens system 100 meets the following expression:

$$(ND_4-ND_3)/(VD_4-VD_3)<0; \quad (5)$$

where $ND_4$ represents a refractive index of the fourth lens 5, $ND_3$ represents a refractive index of the third lens 4, $VD_4$ represents an abbe number of the fourth lens 5, and $VD_3$ represents an abbe number of the third lens 4. Satisfying the expression (5) can effectively correct the chromatic aberration and the coma aberration of the system.

Further, the imaging lens system 100 meets the following expression:

$$-0.43 \text{ mm} \leq SAG_{22}-SAG_{21} \leq -0.21 \text{ mm}; \quad (6)$$

where $SAG_{22}$ represents a sagittal depth of the image side surface S6 of the second lens 3, and $SAG_{21}$ represents a sagittal depth of the object side surface S5 of the second lens 3. Satisfying the expression (6) is conductive to the redirection of lights with large field, and reducing the difficulty of aberration correction of the system in off-axis field due to spherical aberrations.

Further, the imaging lens system 100 meets the following expression:

$$-0.1 \leq (R_{32}-R_{22})/(R_{31}-R_{21}) \leq 138; \quad (7)$$

where $R_{32}$ represents a radius of curvature of the image side surface of the third lens, $R_{22}$ represents a radius of curvature of the image side surface S6 of the second lens 3, $R_{31}$ represents a radius of curvature of the object side surface S5 of the third lens 4, and $R_{21}$ represents a radius of curvature of the object side surface S5 of the second lens 3. Satisfying the expression (7) can effectively shorten the length of the system and achieve the miniaturization of the system.

Please refer to the Table 1-1, relevant parameters of every lens of the imaging lens system 100 provided in this embodiment are shown, where R represents a radius of curvature, d represents a distance between optical surfaces, nd represents a refractive index of the material, and Vd represents an abbe number of the material.

TABLE 1-1

| Surface No. | Surface name | R (mm) | d (mm) | nd | Vd |
|---|---|---|---|---|---|
| S1 | Object surface | — | | | |
| S2 | Object side surface of the first lens 1 | −5.3164 | 0.2777 | 1.54 | 55.9 |
| S3 | Image side surface of the first lens 1 | 6.7666 | 0.5075 | | |
| S4 | Surface of the stop 2 | infinity | 0.1374 | | |
| S5 | Object side surface of the second lens 3 | 9.0514 | 0.8248 | 1.54 | 55.9 |
| S6 | Image side surface of the second lens 3 | −57.9145 | 0.0923 | | |
| S7 | Object side surface of the third lens 4 | 1.0446 | 0.6609 | 1.54 | 55.9 |

TABLE 1-1-continued

| Surface No. | Surface name | R (mm) | d (mm) | nd | Vd |
|---|---|---|---|---|---|
| S8 | Image side surface of the third lens 4 | −0.8697 | 0.0300 | | |
| S9 | Object side surface of the fourth lens 5 | 1.5629 | 0.2850 | 1.66 | 20.3 |
| S10 | Image side surface of the fourth lens 5 | 0.5541 | 0.2000 | | |
| S11 | Surface of the infrared cut-off filter 6 | Infinity | 0.21 | 1.51 | 64 |
| S12 | Imaging plane | | 0.6174 | | |

It can be seen from the Table 1-1 that the abbe number of the fourth lens 5 is the minimum value of the abbe numbers of lenses of the imaging lens system 100, and the refractive index of the fourth lens 5 is the maximum value of the refractive indexes of lenses of the imaging lens system 100.

Please refer to the Table 1-2-1 and the Table 1-2-2, the surface coefficients of every aspherical surface of the imaging lens system 100 provided in this embodiment are shown.

TABLE 1-2-1

| Surface No. | k | B | C | D | E |
|---|---|---|---|---|---|
| S2 | −134.722 | 0.62029 | −0.58973 | 0.43588 | 0.10122 |
| S3 | −1271.402 | 1.31174 | −2.02966 | 5.77639 | −8.18337 |
| S5 | 0.000 | −0.32793 | 1.65954 | −53.46380 | 580.82768 |
| S6 | 81.797 | −1.47902 | 2.05298 | −3.19318 | 1.27410 |
| S7 | −10.368 | 0.12179 | −0.52630 | 0.36545 | −0.02480 |
| S8 | −8.629 | 0.35141 | −0.24622 | −0.50129 | 0.30074 |
| S9 | −8.134 | −0.52418 | −0.02599 | 0.14996 | 0.15341 |
| S10 | −4.543 | −0.35777 | 0.26554 | −0.10950 | 0.03647 |

TABLE 1-2-2

| Surface No. | F | G | H | L | J |
|---|---|---|---|---|---|
| S2 | −0.09767 | −0.25693 | 0.03187 | 0.57333 | −0.40576 |
| S3 | −10.06272 | 48.36106 | 110.37684 | −456.70231 | 334.46360 |
| S5 | −3287.32327 | 9178.30671 | −10021.49598 | 0.00000 | 0.00000 |
| S6 | −1.69718 | 20.13527 | −50.41504 | 51.92914 | −22.32159 |
| S7 | −0.59161 | −0.14676 | 1.18957 | −0.45231 | −0.10516 |
| S8 | 0.14799 | −0.02293 | −0.17205 | 0.03306 | 0.05784 |
| S9 | −0.13522 | −0.20465 | 0.07284 | 0.21891 | −0.11576 |
| S10 | −0.01768 | 0.00422 | 0.00030 | 0.00028 | −0.00017 |

Figures 1, 1A, 2, 3:
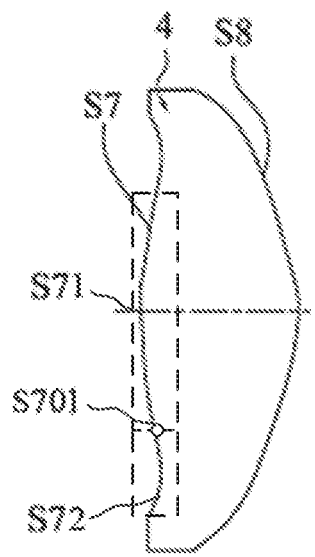
Figures 1, 1A, 2, 3, 4:
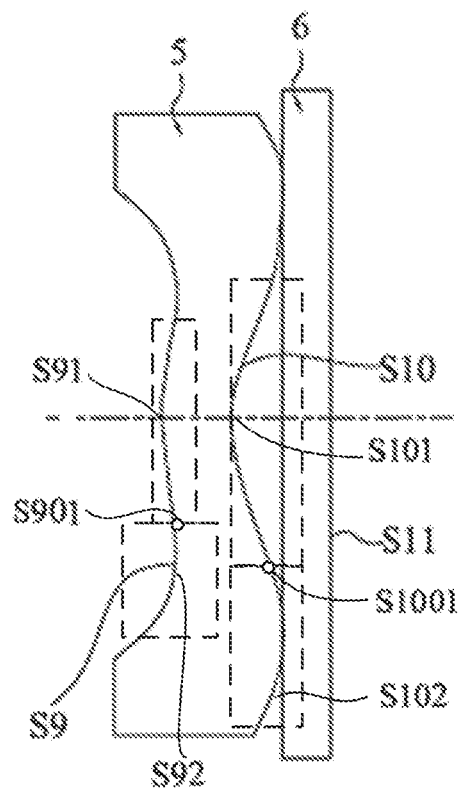
Figure 1B:
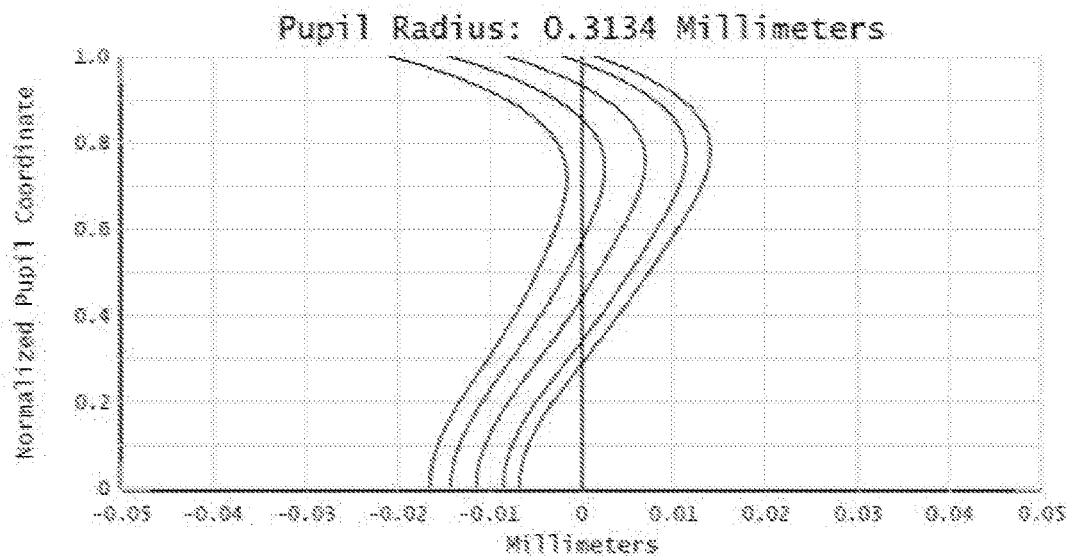
FIG. 1b is a diagram showing longitudinal aberration curves of the imaging lens system according to the first embodiment of the disclosure.
Figure 1C:
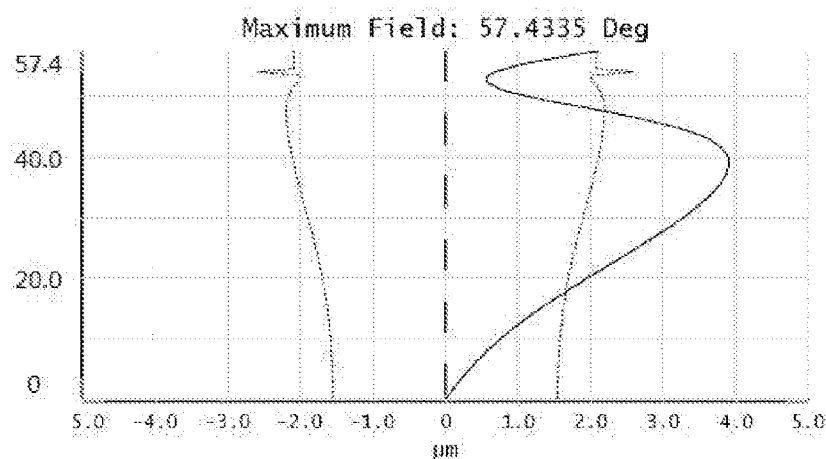
FIG. 1c is a diagram showing a lateral chromatic aberration curve of the imaging lens system according to the first embodiment of the disclosure.
Figure 1D:
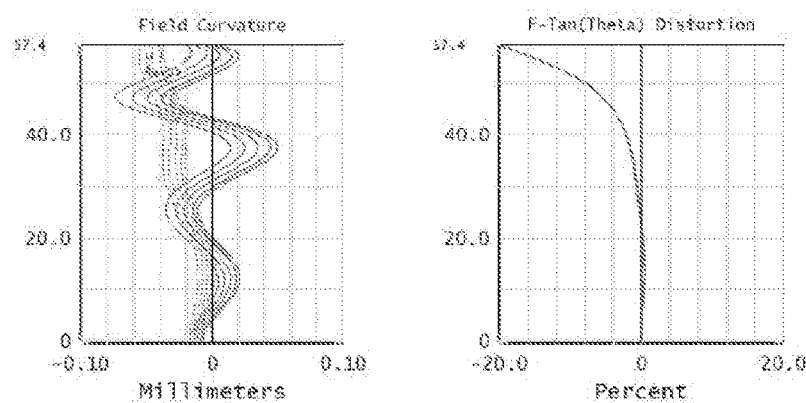
FIG. 1d is a diagram showing field curvature curves and distortion curves of the imaging lens system according to the first embodiment of the disclosure.

The curves of the longitudinal aberration, the lateral chromatic aberration, the field curvature and the distortion are shown in FIG. 1b, FIG. 1c and FIG. 1d, respectively. From FIG. 1b to FIG. 1d, it is apparent that the longitudinal aberration, the lateral chromatic aberration, the field curvature and the distortion can be well corrected.

In summary, the imaging lens system provided in this embodiment utilizes four lenses with specific focal powers and specific surface shapes. The imaging lens system achieves a wide angle with a compact structure, so as to realize a balance between the lens miniaturization and the wide angle requirements, while a short focal length is realized. As such, the system is enabled to have a relatively large field, can shoot larger scenes, and facilitates a subsequent cropping processing. Furthermore, such design of the imaging lens system enhances the feeling of depth and sense of space of the imaging pictures, thereby providing a superior imaging quality. Furthermore, every lens of the imaging lens system is aspheric lens. Using aspheric lens has the following advantages:
1. Enabling the system to achieve a superior imaging quality.
2. Enabling the system to be more compact.
3. Shortening a total optical length of the system.

Embodiment 2

Figures 1, 2A:
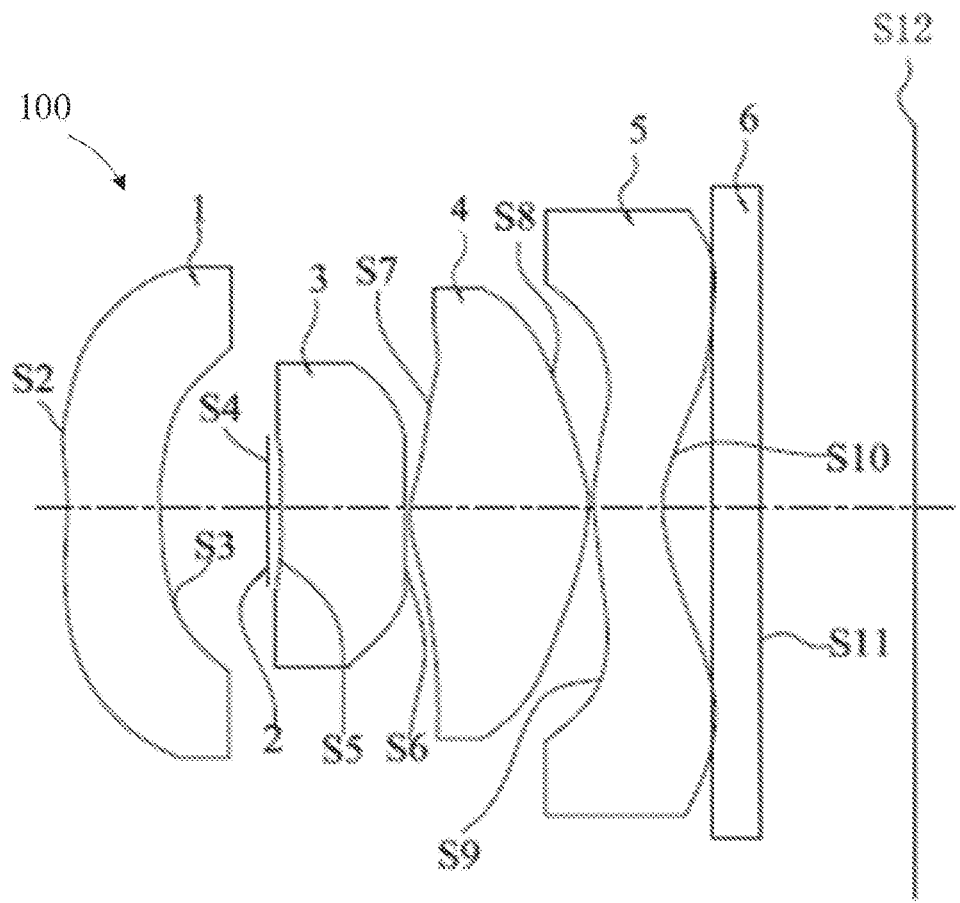
Figures 2, 2A:
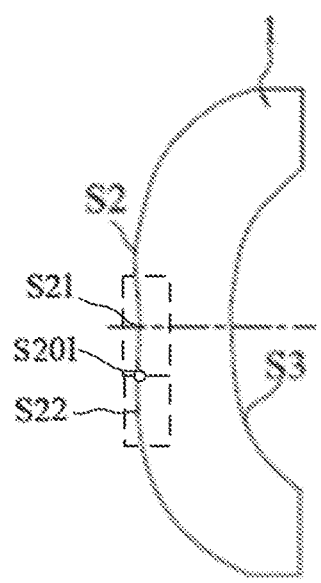
Figures 2, 2A, 3:
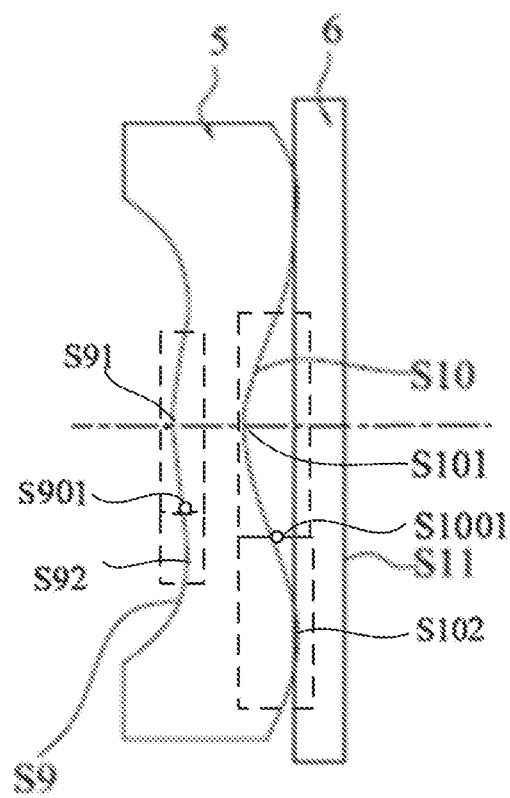

Referring to FIG. 2a-1, the imaging lens system 100 provided in a second embodiment of the disclosure is shown. The first lens 1 has an object side surface S2 and an image side surface S3. The second lens 3 an object side surface S5 and an image side surface S6. A paraxial region of the object side surface S5 is concave. The image side surface S6 is a substantially a convex surface, and a paraxial region of the image side surface S6 is concave. Both of an object side surface S7 and an image side surface S8 of the third lens 4 are convex. The fourth lens 5 has an object side surface S9 and an image side surface S10.

FIG. 2a-2 illustrates a schematic structural diagram of the first lens 1 of the imaging lens system as illustrated in FIG. 2a-1. The first fens 1 is a meniscus lens and both of the object side surface S2 and the image side surface S3 are curved surfaces. The object side surface S2 is substantially a convex surface and includes a paraxial region S21 and a peripheral region S22. At least one inflection point S201 is defined between the paraxial region S21 and the peripheral region S22 in the object side surface S2. Local curvature of the object side surface S2 crosses zero at the at least one inflection point S201 from the paraxial region S21 to the peripheral region S22. The paraxial region S21 is concave relative to the at least one inflection point S201. The peripheral region S22 is convex to the object side. The image side surface S3 is concave.

FIG. 2a-3 illustrates a schematic structural diagram of the fourth lens 5 of the imaging lens system as illustrated in FIG. 2a-l. Both of object side surface S9 and image side surface S10 of the fourth lens 5 are curved surfaces. The object side surface S9 includes a paraxial region S91 and a peripheral region S92. At least one inflection point S901 is defined between the paraxial region S91 and the peripheral region S92 in the object side surface S9. Local curvature of the object side surface S9 crosses zero at the at least one inflection point S901 from the paraxial region S91 to the peripheral region S92. The paraxial region S91 is convex relative to the at least one inflection point S901. The peripheral region S92 is concave to the object side. The image side surface S10 includes a paraxial region S101 and a peripheral region S102, and at least one inflection point S1001 is defined between the paraxial region S101 and the peripheral region S102 in the image side surface S10. Local curvature of the image side surface S10 crosses zero at the at least one inflection point S1001 from the paraxial region S101 to the peripheral region S102. The paraxial region S101 is concave relative to the at least one inflection point S1001. The peripheral region S102 is convex to the image side.

The difference between the imaging lens system 100 provided in this embodiment and the imaging lens system 100 provided in the first embodiment is: the imaging lens system 100 provided in this embodiment uses the lens parameters shown in the following Table 2-1, Table 2-2-1 and Table 2-2-2.

Please refer to the Table 2-1, relevant parameters of every lens of the imaging lens system 100 provided in this embodiment are shown.

TABLE 2-1

| Surface No. | Surface name | R (mm) | d (mm) | nd | Vd |
|---|---|---|---|---|---|
| S1 | Object surface | — | | | |
| S2 | Object side surface of the first lens 1 | −7694.12 | 0.30 | 1.54 | 55.9 |
| S3 | Image side surface of the first lens 1 | 7.20 | 0.38 | | |
| S4 | Surface of the stop 2 | Infinity | 0.14 | | |
| S5 | Object side surface of the second lens 3 | −8.10 | 0.50 | 1.54 | 55.9 |
| S6 | Image side surface of the second lens 3 | 1.86 | 0.03 | | |
| S7 | Object side surface of the third lens 4 | 0.82 | 0.88 | 1.54 | 55.9 |
| S8 | Image side surface of the third lens 4 | −0.61 | 0.03 | | |
| S9 | Object side surface of the fourth lens 5 | 1.31 | 0.28 | 1.66 | 20.3 |
| S10 | Image side surface of the fourth lens 5 | 0.48 | 0.20 | | |
| S11 | Surface of the infrared cut-off filter 6 | Infinity | 0.21 | 1.51 | 64 |
| S12 | Imaging plane | Infinity | 0.62 | | |

It can be seen from the Table 2-1 that the abbe number of the fourth lens 5 is the minimum value of the abbe numbers of lenses of the imaging lens system 100, and the refractive index of the fourth lens 5 is the maximum value of the refractive indexes of lenses of the imaging lens system 100.

Please refer to Table 2-2-1 and Table 2-2-2, the surface coefficients of every aspherical surface of the imaging lens system 100 provided in this embodiment are shown.

TABLE 2-2-1

| Surface No. | k | B | C | D | E |
|---|---|---|---|---|---|
| S2 | 917918.1 | 0.5002 | −0.504.3 | 0.4557 | −0.0086 |
| S3 | −146.0 | 0.9255 | −1.8626 | 5.9141 | −9.7271 |
| S5 | 0.0 | −0.5099 | 1.1257 | −51.8652 | 562.2024 |
| S6 | −75.5 | −1.4422 | 1.5126 | −3.4788 | 1.1556 |
| S7 | −10.4 | 0.0322 | −0.3269 | 0.1348 | 0.2182 |
| S8 | −4.5 | 0.0536 | 0.1298 | −0.4777 | 0.2577 |
| S9 | −1.5 | −0.6378 | −0.2857 | 0.1754 | 0.3106 |
| S10 | −3.8 | −0.4032 | 0.2761 | −0.1178 | 0.0354 |

TABLE 2-2-2

| Surface No. | F | G | H | L | J |
|---|---|---|---|---|---|
| S2 | −0.1683 | −0.2217 | 0.1310 | 0.6346 | −0.5135 |
| S3 | −13.0584 | 46.6218 | 114.7737 | −442.6354 | 343.5580 |
| S5 | −3368.7781 | 9323.9025 | −8976.4662 | 0.0000 | 0.0000 |
| S6 | −2.4172 | 18.2005 | −46.4829 | 66.0108 | −86.1811 |
| S7 | −0.2816 | −0.1546 | 0.8643 | −0.7434 | 0.1709 |
| S8 | 0.1198 | −0.0026 | −0.1471 | 0.0303 | 0.0169 |
| S9 | −0.0299 | −0.1942 | 0.0269 | 0.1729 | −0.1209 |
| S10 | −0.0154 | 0.0057 | 0.0006 | 0.0001 | −0.0003 |

Figure 2B:
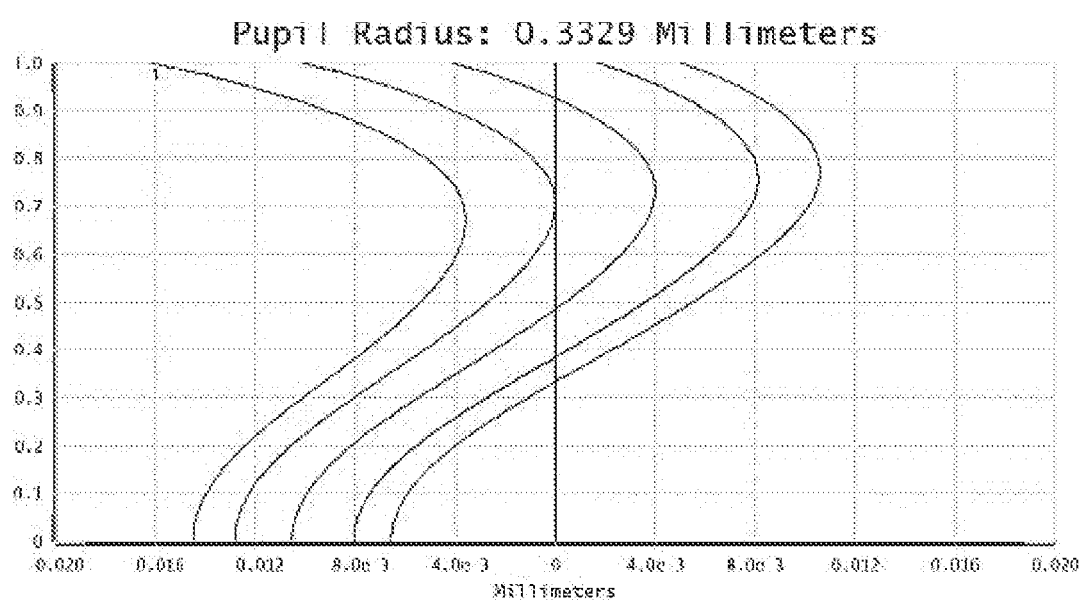
FIG. 2b is a diagram showing longitudinal aberration curves of the imaging lens system according to the second embodiment of the disclosure.
Figure 2C:
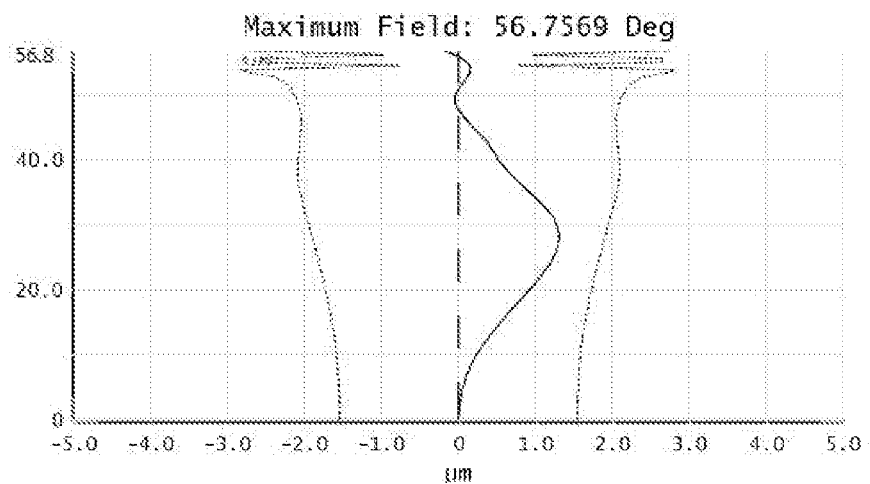
FIG. 2c is a diagram showing a lateral chromatic aberration curve of the imaging lens system according to the second embodiment of the disclosure.
Figure 2D:
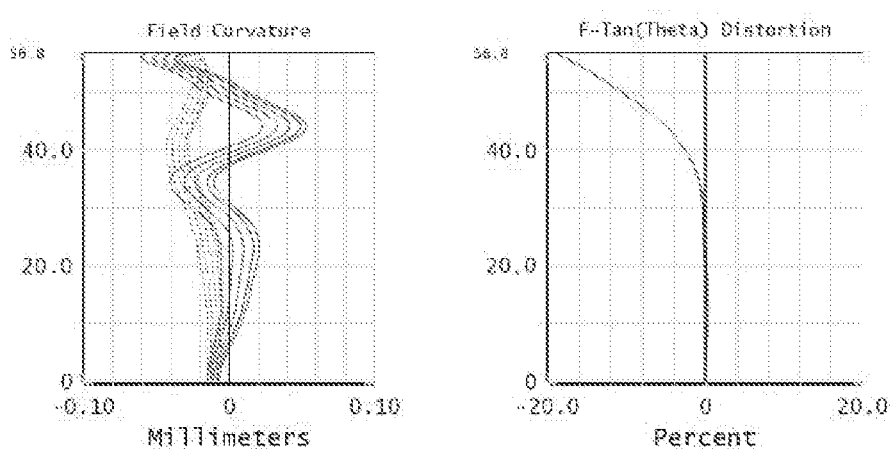
FIG. 2d is a diagram showing field curvature curves and distortion curves of the imaging lens system according to the second embodiment of the disclosure.

The curves of the longitudinal aberration, the lateral chromatic aberration, the field curvature and the distortion are shown in FIG. 2b, FIG. 2c and FIG. 2d, respectively. From FIG. 2b to FIG. 2d, it is apparent that the longitudinal aberration, the lateral chromatic aberration, the field curvature and the distortion can be well corrected.

Embodiment 3

Figures 1, 3A:
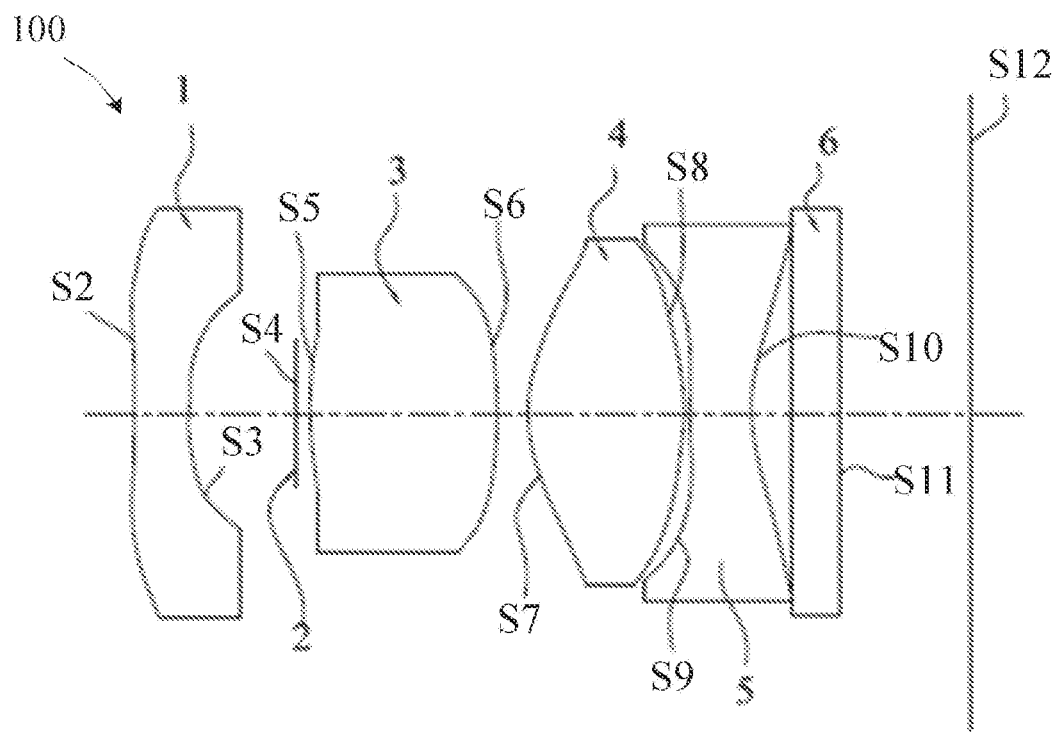
Figures 2, 3A:
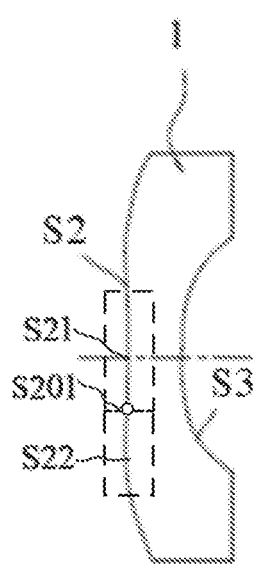
Figures 3, 3A:
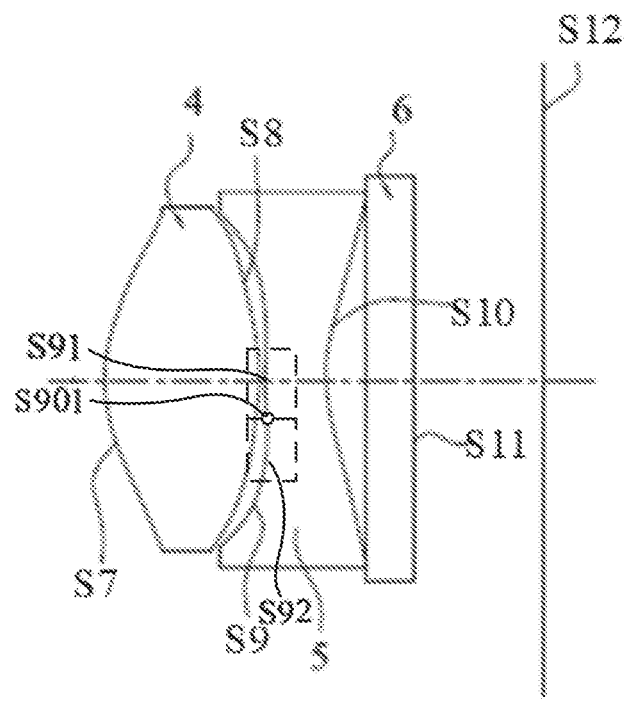

Referring to the FIG. 3a-1, the imaging lens system 100 provided in a third embodiment of the disclosure is shown.

The first lens 1 has an object side surface S2 and an image side surface S3. Both of an object side surface S5 and an image side surface S6 of the second lens 3 are convex. Both of an object side surface S7 and an image side surface S8 of the third lens 4 are convex. The fourth lens 5 has an object side surface S9 and an image side surface S10.

FIG. 3a-2 illustrates a schematic structural diagram of the first lens 1 of the imaging lens system as illustrated in FIG. 3a-1, according to an embodiment of the disclosure. The first fens 1 is a meniscus lens and both of the object side surface S2 and the image side surface S3 are curved surfaces. The object side surface S2 is substantially a convex surface and includes a paraxial region S21 and a peripheral region S22, and at least one inflection point S201 is defined between the paraxial region S21 and the peripheral region S22 in the image side surface S2. Local curvature of the object side surface S2 crosses zero at the at least one inflection point S201 from the paraxial region S21 to the peripheral region S22. The paraxial region S21 is concave relative to the at least one inflection point S201. The peripheral region S22 is convex to the object side. The image side surface S3 is concave.

FIG. 3a-3 illustrates a schematic structural diagram of the fourth lens 5 of the imaging lens system as illustrated in FIG. 3a-1, according to an embodiment of the disclosure. Both of object side surface S9 and image side surface S10 of the fourth lens 5 are curved surfaces. The object side surface S9 includes a paraxial region S91 and a peripheral region S92, and at least one inflection point S901 is defined between the paraxial region S91 and the peripheral region S92 in the object side surface S9. The paraxial region S91 is convex relative to the at least one inflection point S901. The peripheral region S92 is concave to the object side. The image side surface S10 is concave.

The difference between the imaging lens system 100 provided in this embodiment and the imaging lens system 100 provided in the first embodiment is: the imaging lens system 100 provided in this embodiment uses the lens parameters shown in the following Table 3-1, Table 3-2-1 and 3-2-2.

Please refer to the Table 3-1, relevant parameters of every lens of the imaging lens system provided in this embodiment are shown.

TABLE 3-1

| Surface No. | Surface name | R (mm) | d (mm) | nd | Vd |
|---|---|---|---|---|---|
| S1 | Object surface | — | | | |
| S2 | Object side surface of the first lens 1 | −2.0073 | 0.2500 | 1.54 | 55.9 |
| S3 | Image side surface of the first lens 1 | 2.0198 | 0.4971 | | |
| S4 | Surface of the stop 2 | Infinity | 0.0680 | | |
| S5 | Object side surface of the second lens 3 | 2.1224 | 0.8632 | 1.54 | 55.9 |
| S6 | Image side surface of the second lens 3 | −8.7917 | 0.1607 | | |
| S7 | Object side surface of the third lens 4 | 0.8299 | 0.7200 | 1.54 | 55.9 |
| S8 | Image side surface of the third lens 4 | −1.0127 | 0.0300 | | |
| S9 | Object side surface of the fourth lens 5 | 12.8772 | 0.2850 | 1.66 | 20.3 |
| S10 | Image side surface of the fourth lens 5 | 0.7772 | 0.2000 | | |
| S11 | Surface of the infrared cut-off filter 6 | Infinity | 0.2100 | 1.51 | 64 |
| S12 | Imaging plane | Infinity | 0.6174 | | |

It can be seen from the Table 3-1 that the abbe number of the fourth lens 5 is the minimum value of the abbe numbers of lenses of the imaging lens system 100, and the refractive index of the fourth lens 5 is the maximum value of the refractive indexes of lenses of the imaging lens system 100.

Please refer to Table 3-2-1 and Table 3-2-2, the surface coefficients of every aspherical surface of the imaging lens system 100 in this embodiment are shown.

TABLE 3-2-1

| Surface No. | k | B | C | D | E |
|---|---|---|---|---|---|
| S2 | 917918.1 | 0.483 | −0.673 | 0.503 | 0.051 |
| S3 | −146.0 | 1.365 | −1.498 | −2.749 | 14.916 |
| S5 | −0.135 | 1.460 | −51.398 | 597.570 | −3295.317 |
| S6 | −1.226 | 2.302 | −3.832 | 1.836 | −1.089 |
| S7 | 0.229 | −0.264 | 0.080 | 0.220 | −0.339 |
| S8 | 0.186 | −0.274 | −0.489 | 0.348 | 0.111 |
| S9 | −0.545 | −0.197 | 0.118 | 0.184 | 0.027 |
| S10 | −0.277 | 0.320 | −0.129 | 0.086 | −0.009 |

TABLE 3-2-2

| Surface No. | F | G | H | L | J |
|---|---|---|---|---|---|
| S2 | −0.085 | −0.228 | −0.061 | 0.438 | −0.219 |
| S3 | −20.273 | 180.295 | −58.325 | −2852.069 | 6033.480 |
| S5 | 8328.015 | −7209.935 | 0.000 | 0.000 | −0.135 |
| S6 | 21.153 | −49.500 | 37.895 | −8.824 | −1.226 |
| S7 | −0.277 | 0.740 | −0.926 | 0.127 | 0.229 |
| S8 | −0.101 | −0.287 | −0.027 | 0.662 | 0.186 |
| S9 | 0.028 | 0.207 | 0.159 | −0.075 | −0.545 |
| S10 | −0.030 | −0.005 | 0.045 | −0.015 | −0.277 |

Figure 3B:
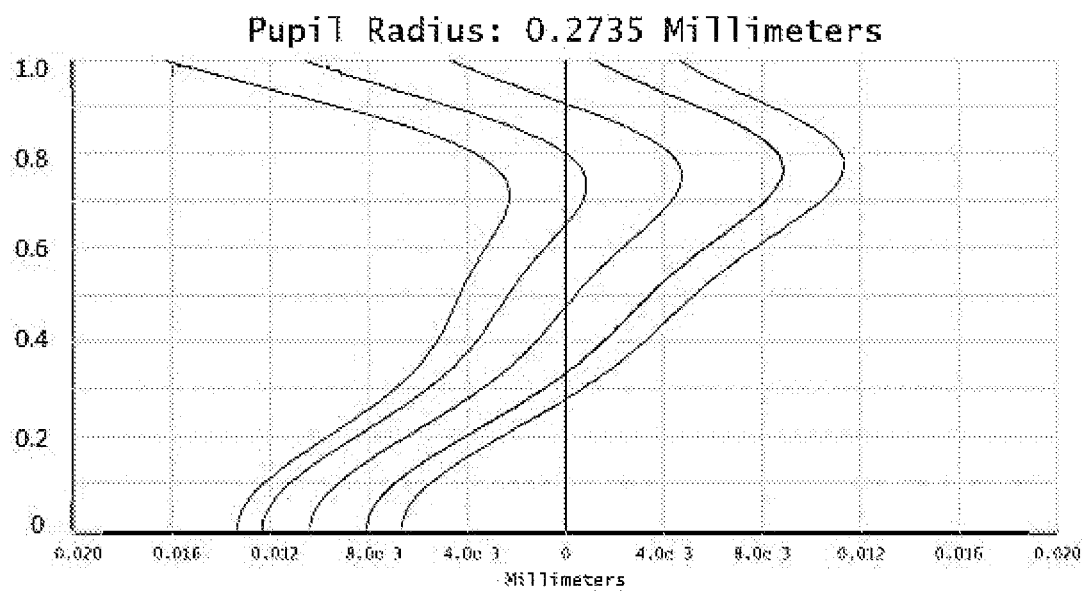
FIG. 3b is a diagram showing longitudinal aberration curves of the imaging lens system according to the third embodiment of the disclosure.
Figure 3C:
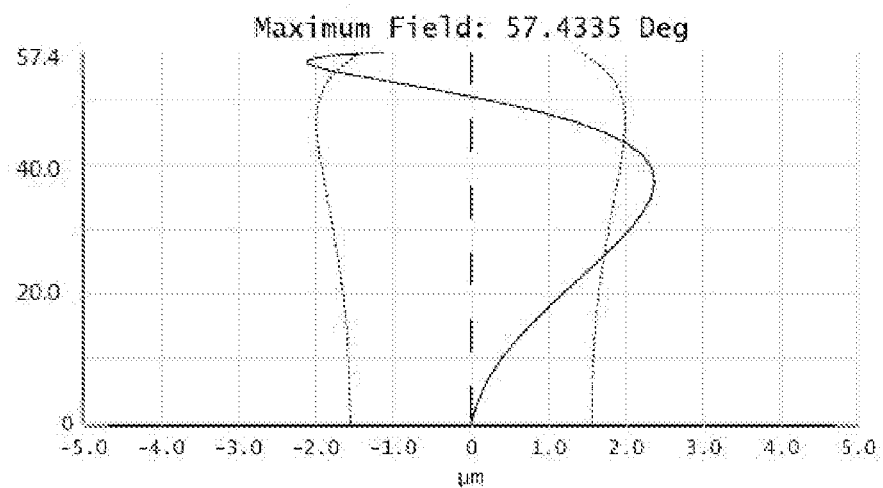
FIG. 3c is a diagram showing a lateral chromatic aberration curve of the imaging lens system according to the third embodiment of the disclosure.
Figure 3D:
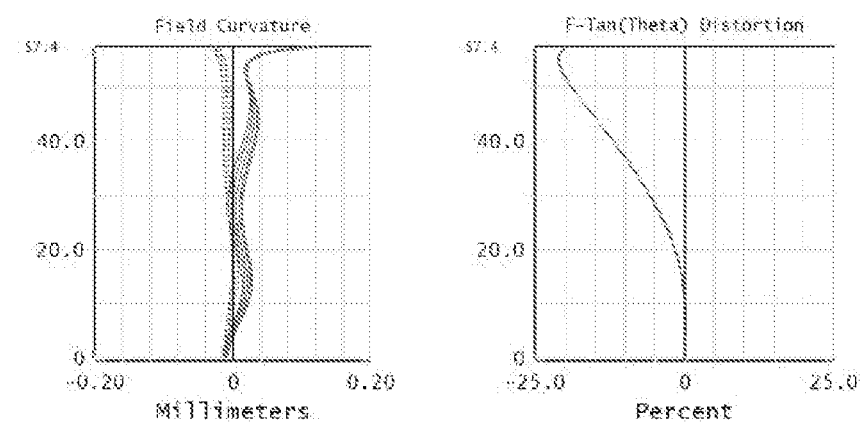
FIG. 3d is a diagram showing field curvature curves and distortion curves of the imaging lens system according to the third embodiment of the disclosure.

The curves of the longitudinal aberration, the lateral chromatic aberration, the field curvature and the distortion are shown in FIG. 3b FIG. 3c and FIG. 3d, respectively. From FIG. 3b to FIG. 3d, it is apparent that the longitudinal aberration, the lateral chromatic aberration, the field curvature and the distortion can be well corrected.

Embodiment 4

Figures 1, 4A:
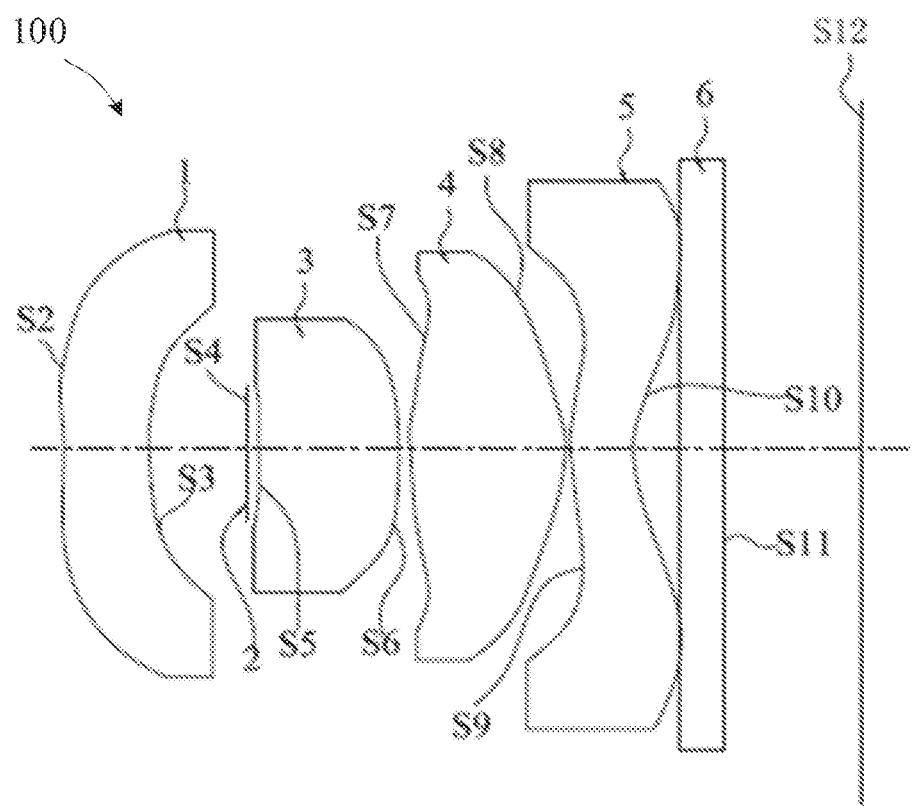
Figures 2, 4A:
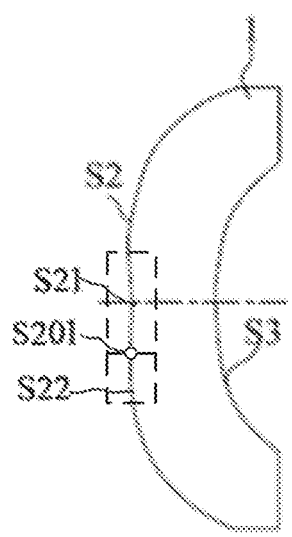
Figures 3, 4A:
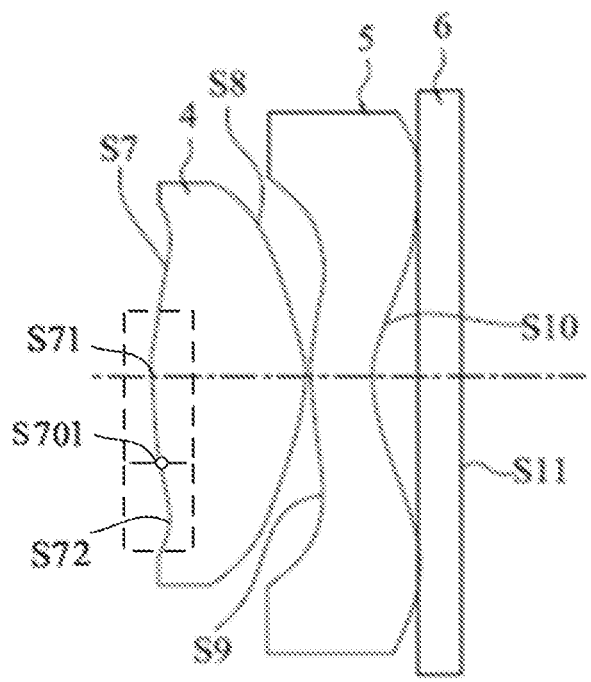
Figures 4, 4A:
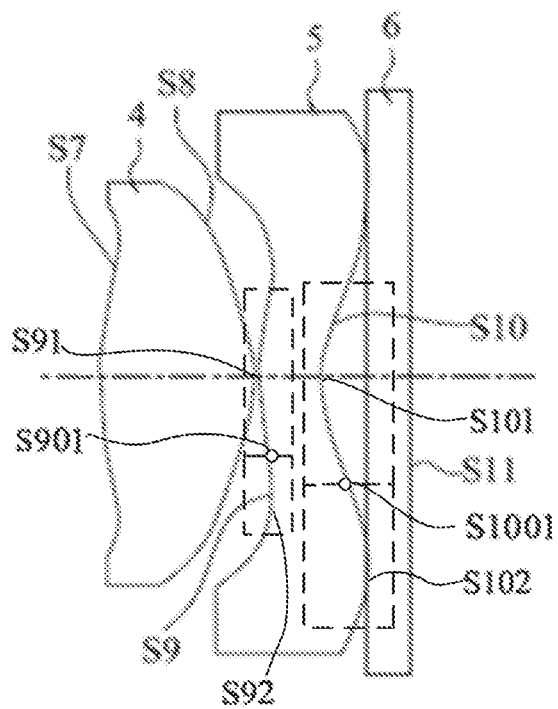

Referring to the FIG. 4a-1, the imaging lens system 100 provided in a fourth embodiment of the disclosure is shown. The first lens 1 has an object side surface S2 and an image side surface S3. The second lens 3 has an object side surface S5 and a convex image side surface S6. The paraxial region of the object side surface S5 is concave. The third lens 4 has an object side surface S7 and an image side surface S8. The fourth lens 5 has an object side surface S9 and an image side surface S110.

FIG. 4a-2 illustrates a schematic structural diagram of the first lens 1 of the imaging lens system as illustrated in FIG. 4a-1, according to an embodiment of the disclosure. The first fens 1 is a meniscus lens and both of the object side surface S2 and the image side surface S3 are curved surfaces. The object side surface S2 is substantially a convex surface and includes a paraxial region S21 and a peripheral region S22. At least one inflection point S201 is defined between the paraxial region S21 and the peripheral region S22 in the object side surface S2. Local curvature of the object side surface S2 crosses zero at the at least one inflection point S201 from the paraxial region S21 to the peripheral region S22. The paraxial region S21 is concave relative to the at least one inflection point S201. The peripheral region S22 is convex to the object side. The image side surface S3 is concave.

FIG. 4a-3 illustrates a schematic structural diagram of the third lens 4 of the imaging lens system as illustrated in FIG. 4a-1, according to an embodiment of the disclosure. Both of the object side surface S7 and the image side surface S8 of the third lens 4 are curved surfaces. The object side surface S7 includes a paraxial region S71 and a peripheral region S72, and at least one inflection point S701 is defined between the paraxial region S71 and the peripheral region S72. Local curvature of the object side surface S7 crosses zero at the at least one inflection point S701 from the paraxial region S71 to the peripheral region S72. The paraxial region S71 is convex relative to the at least one inflection point S701. The peripheral region S72 is concave to the object side. The image side surface S8 is convex.

FIG. 4a-4 illustrates a schematic structural diagram of the fourth lens 5 of the imaging lens system as illustrated in FIG. 4a-1, according to an embodiment of the disclosure. Both of object side surface S9 and image side surface S10 of the fourth lens 5 are curved surfaces. The object side surface S9 includes a paraxial region S91 and a peripheral region S92, and at least one inflection point S901 is defined between the paraxial region S91 and the peripheral region S92. Local curvature of the object side surface S9 crosses zero at the at least one inflection point S901 from the paraxial region S91 to the peripheral region S92. The paraxial region S91 is convex relative to the at least one inflection point S901. The peripheral region S92 is concave to the object side. The image side surface S10 includes a paraxial region S101 and a peripheral region S102, and at least one inflection point S1001 is defined between the paraxial region S101 and the peripheral region S102. Local curvature of the image side surface S10 crosses zero at the at least one inflection point S1001 from the paraxial region S101 to the peripheral region S102. The paraxial region S101 is concave relative to the at least one inflection point S1001. The peripheral region S102 is convex to the image side.

The difference between the imaging lens system 100 provided in this embodiment and the imaging lens system provided in the first embodiment is: the imaging lens system 100 provided in this embodiment uses the lens parameters shown in the following Table 4-1, Table 4-2-1 and 4-2-2.

Please refer to the Table 4-1, relevant parameters of every lens of the imaging lens system 100 provided in this embodiment are shown.

TABLE 4-1

| Surface No. | Surface name | R (mm) | d (mm) | nd | Vd |
|---|---|---|---|---|---|
| S1 | Object surface | — | | | |
| S2 | Object side surface of the first lens 1 | 27.47898 | 0.40246 | 1.54 | 55.9 |
| S3 | Image side surface of the first lens 1 | 2.70125 | 0.43209 | | |
| S4 | Surface of the stop 2 | Infinity | 0.05604 | | |
| S5 | Object side surface of the second lens 3 | −15.33571 | 0.62384 | 1.54 | 55.9 |
| S6 | Image side surface of the second lens 3 | −20.71368 | 0.06117 | | |
| S7 | Object side surface of the third lens 4 | 1.25035 | 0.69802 | 1.54 | 55.9 |
| S8 | Image side surface of the third lens 4 | −0.73685 | 0.03000 | | |
| S9 | Object side surface of the fourth lens 5 | 1.24790 | 0.28496 | 1.66 | 20.3 |
| S10 | Image side surface of the fourth lens 5 | 0.55862 | 0.20000 | | |
| S11 | Surface of the infrared cut-off filter 6 | Infinity | 0.21000 | 1.51 | 64 |
| S12 | Imaging plane | Infinity | 0.61744 | | |

It can be seen from the Table 4-1 that the abbe number of the fourth lens 5 is the minimum value of the abbe numbers of lenses of the imaging lens system, and the refractive index of the fourth lens 5 is the maximum value of the refractive indexes of lenses of the imaging lens system.

Please refer to Table 4-2-1 and Table 4-2-2, the surface coefficients of every aspherical surface of the imaging lens system 100 in this embodiment are shown.

TABLE 4-2-1

| Surface No. | k | B | C | D | E |
|---|---|---|---|---|---|
| S2 | −12081.36 | 0.5430 | −0.5446 | 0.4788 | 0.0921 |
| S3 | −33.79 | 1.2707 | −1.8202 | 6.2618 | −7.8287 |
| S5 | 0.00 | −0.5029 | 1.3199 | −55.6944 | 564.7364 |
| S6 | 923.66 | −1.5593 | 1.6656 | −3.8098 | 0.7005 |
| S7 | −13.77 | 0.0277 | −0.4418 | 0.0112 | 0.0941 |
| S8 | −4.87 | 0.2464 | −0.1770 | −0.5190 | 0.3087 |
| S9 | −3.53 | −0.5491 | −0.1676 | 0.1620 | 0.2021 |
| S10 | −4.13 | −0.3749 | 0.2535 | −0.1154 | 0.0346 |

TABLE 4-2-2

| Surface No. | F | G | H | L | J |
|---|---|---|---|---|---|
| S2 | −0.1503 | −0.3046 | 0.0201 | 0.6075 | −0.3414 |
| S3 | −11.0639 | 43.0826 | 99.0966 | −464.1522 | 378.8854 |
| S5 | −3402.6694 | 8887.8640 | −1931.1399 | 0.0000 | 0.0000 |
| S6 | −1.3266 | 21.8486 | −48.0275 | 49.0982 | −54.1548 |
| S7 | −0.3344 | −0.0706 | 1.0456 | −0.6180 | 0.0263 |
| S8 | 0.1283 | −0.0503 | −0.2089 | 0.0022 | 0.0655 |
| S9 | −0.1138 | −0.2169 | 0.0467 | 0.1956 | −0.1319 |
| S10 | −0.0174 | 0.0051 | 0.0009 | 0.0004 | −0.0004 |

Figure 4B:
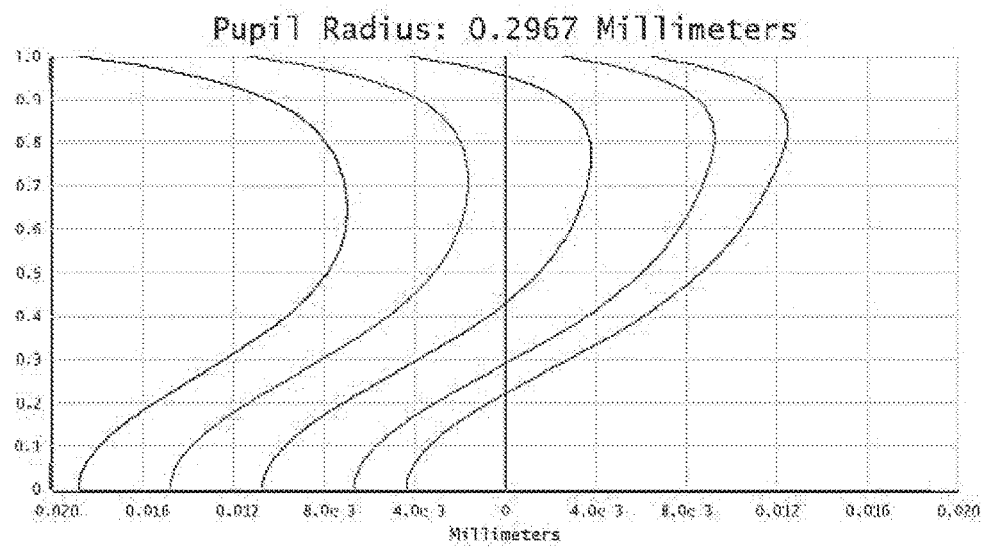
FIG. 4b is a diagram showing longitudinal aberration curves of the imaging lens system according to the fourth embodiment of the disclosure.
Figure 4C:
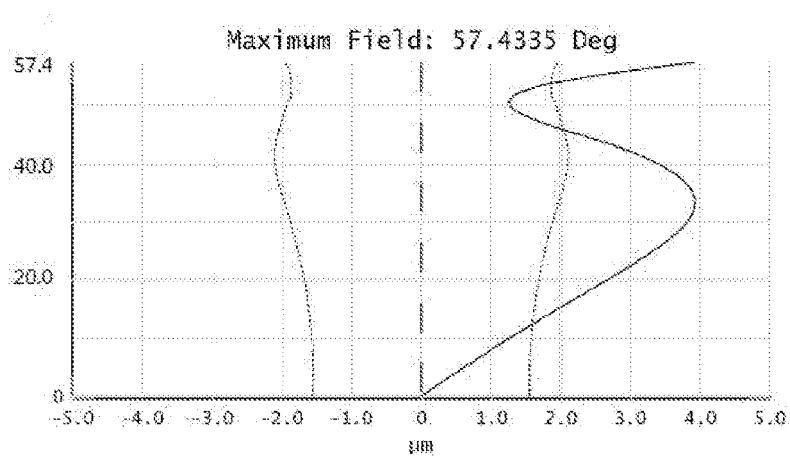
FIG. 4c is a diagram showing a lateral chromatic aberration curve of the imaging lens system according to the fourth embodiment of the disclosure.
Figure 4D:
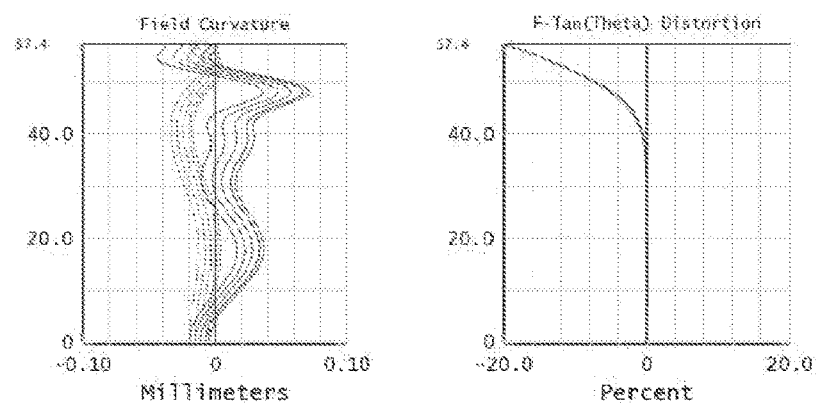
FIG. 4d is a diagram showing field curves and distortion curvature curves of the imaging lens system according to the fourth embodiment of the disclosure.

The curves of the longitudinal aberration, the lateral chromatic aberration, the field curvature and the distortion are shown in FIG. 4b, FIG. 4c and FIG. 4d, respectively. From FIG. 4b to FIG. 4d, it is apparent that the longitudinal aberration, the lateral chromatic aberration, the field curvature and the distortion can be well corrected.

Please refer to Table 5, optical characteristics corresponding to the above first to fourth embodiments and values corresponding to the above-mentioned expressions are shown. The optical characteristics include the system focal length f, the aperture number n the total optical length TTL and the field of view 2θ. In Table 5, it can be seen that the maximum of the total optical length TTL of the imaging lens system is 3.9 mm, so that the volume of the imaging lens system is effectively small; the maximum of the field 2θ of the imaging lens system is 1550 degree which is relatively large.

TABLE 5

| Optical characteristics or expression | Embodiment 1 | Embodiment 2 | Embodiment 3 | Embodiment 4 |
|---|---|---|---|---|
| f (mm) | 1.379 | 1.464 | 1.2 | 1.3 |
| F# | 2.2 | 2.2 | 2.2 | 2.2 |
| TTL (mm) | 3.84 | 3.584 | 3.9 | 3.6.1 |
| 2θ | 115° | 115° | 115° | 115° |
| $f_1/f$ | −2.4 | −4 | −9 | −1.5 |
| $f_3/f_2$ | 0.08 | −0.3 | 0.3 | 1 |
| $(SAG_{11} - SAG_{12})/(SAG_{42} - SAG_{41})$ | 0.17 | 0.23 | −0.3 | 0.7 |
| $Rdf_{0.7}$ | 21.5° | 21.7° | 21.9° | 22° |
| $(ND_4 - ND_3)/(VD_4 - VD_3)$ | −0.00337 | −0.00337 | −0.00337 | −0.00337 |

TABLE 5-continued

| Optical characteristics or expression | Embodiment 1 | Embodiment 2 | Embodiment 3 | Embodiment 4 |
|---|---|---|---|---|
| $SAG_{22} - SAG_{21}$ | −0.43 | −0.25 | −0.21 | −0.24 |
| $(R_{32} - R_{22})/(R_{31} - R_{21})$ | 0.1 | −0.1 | 0.4 | 138 |

It should be noted that, the imaging lens system provided in any of the above first to fourth embodiments can be used in cell phones, tablets, security monitoring equipment, driving recorders and other terminal devices.

Embodiment 4

Figure 5:
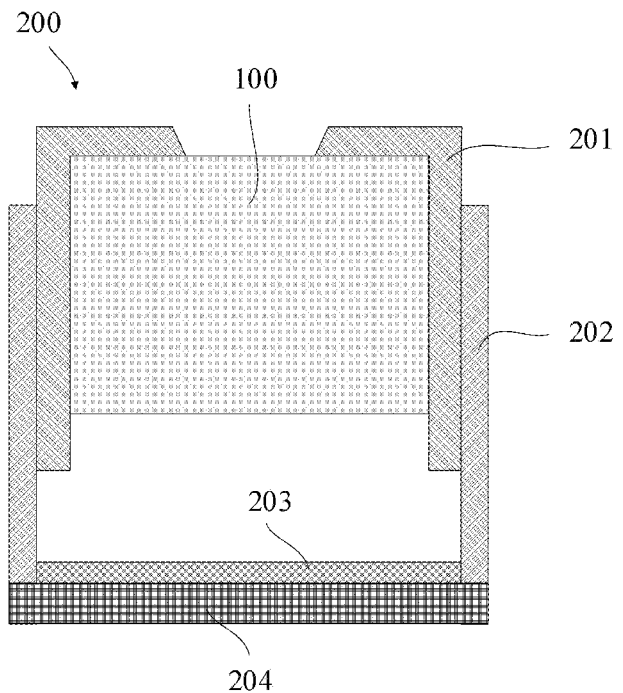
FIG. 5 is a schematic structural diagram of a camera module according to a fifth embodiment of the disclosure.

FIG. 5 illustrates a camera module 200, which includes the imaging lens system 100 of any embodiment as described above, a barrel 201, a holder 202, an image sensor 203, and a printed circuit board 204. The imaging lens system 100 is received in the barrel 201, and the barrel 201 is engaged with the holder 202. The image sensor 203 and the printed circuit board 204 are substantially accommodated in the holder 202. The image sensor 203 is opposite to the imaging lens system 100 and is mounted on the printed circuit board 204. The image sensor 203 is configured for converting light signals into electrical signals, thereby the images formed by the imaging lens system 100 can be converted and transmitted to a processor via the printed circuit board 204. The imaging component 200 as described above can be used as the image sensor 203 in this embodiment.

Embodiment 5

Figure 6:
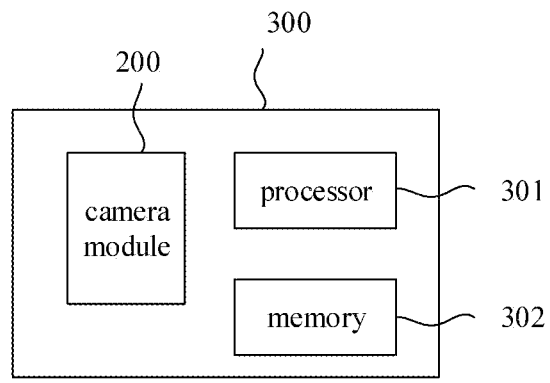
FIG. 6 is a schematic block diagram of a mobile phone according to a sixth embodiment of the disclosure.
Figure 7:
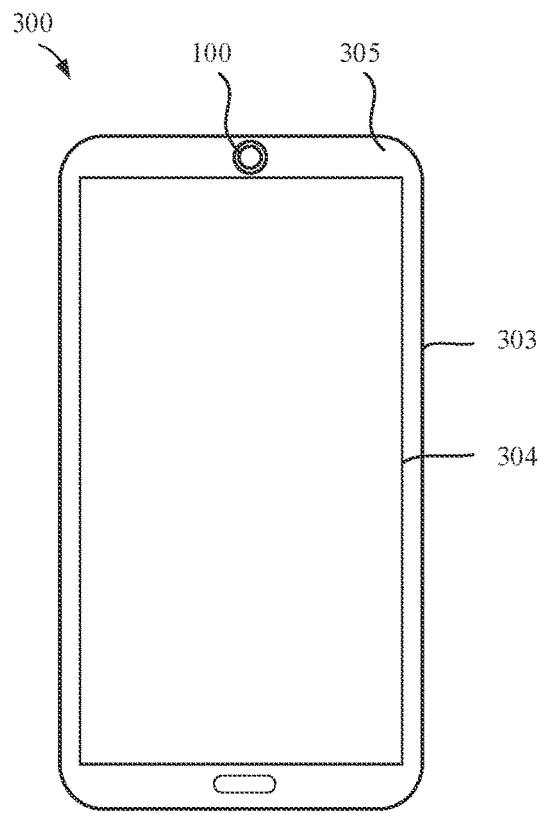
FIG. 7 is a schematic diagram of the mobile phone according to the sixth embodiment of the disclosure.

As illustrated in FIG. 6 and FIG. 7, the disclosure further provides an electronic device, such as a mobile phone 300. The mobile phone 300 includes the camera module 200 as described above, a processor 301, a memory 302, a housing 303, and a display screen 304. The camera module 200, the processor 301 and the memory 302 are received in the housing 303. The display screen 304 is engaged with the housing 303. The mobile phone 300 has a front surface 305, the camera module 200 and the display screen 304 are exposed from the front surface 305. The camera module 200 may be positioned above the display screen 304. The display screen 304 may be a touch screen. The processor 301 is communicated with the printed circuit board 204 and the memory 302, the memory 302 is configured to store the images captured by the camera module 200, and the processor 301 is configured to process the images captured by the camera module 200.

One of ordinary skill in the art understands that the mobile phone 300 also includes other components, such as an antenna, a battery, a memory, an I/O module and so on.

Embodiment 6

Figure 8:
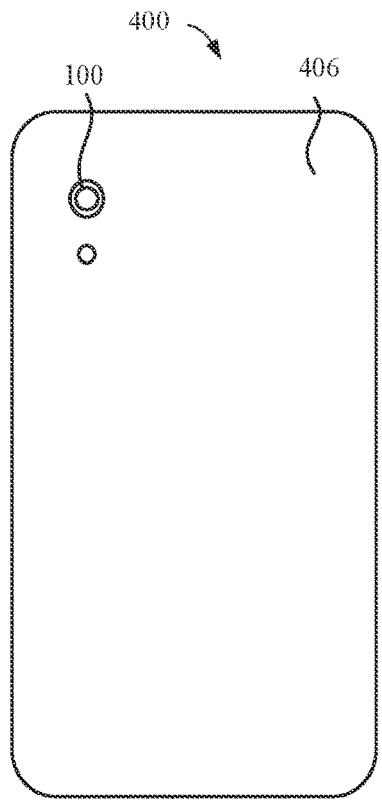
FIG. 8 is a schematic diagram of a mobile phone according to a seventh embodiment of the disclosure.

As illustrated in FIG. 8, the disclosure further provides a mobile phone 400, the mobile phone 400 includes the camera module 200 as described above, and the camera module 200 is exposed from a rear surface 406 of the mobile phone 400.

The above embodiments just express several implementation manners of the disclosure, and the descriptions thereof are relatively specific and detailed, but cannot be understood as limiting the scope of the disclosure. It should be noted that, for those skilled in the art, without departing from the concept of the disclosure, modifications and improvements can be made, and these all belong to the protection scope of the disclosure. Therefore, the scope of the disclosure should be subject to the appended claims.

What is claimed is:

1. An imaging lens system, from an object side to an imaging plane, sequentially comprising:
    a first lens with a negative focal power, wherein an object side surface of the first lens comprises a paraxial region and a peripheral region; wherein in the object side surface of the first lens, at least one inflection point is defined between the paraxial region and the peripheral region, and the paraxial region is concave relative to the at least one inflection point;
    a second lens with a positive focal power;
    a third lens with a positive focal power, an image side surface of the third lens being convex; and
    a fourth lens with a negative focal power, a paraxial region of an image side surface of the fourth lens being concave;
    wherein the imaging lens system meets the following expression:

$$Rdf_{0.7} \leq 22°;$$

where $Rdf_{0.7}$ represents an angle at which lights of 0.7 field pass through an object side surface of the fourth lens.

2. The imaging lens system as claimed in claim 1, wherein the imaging lens system meets the following expression:

$$-9 \leq f_1/f \leq -1.5;$$

where f represents a focal length of the imaging lens system, and $f_1$ represents an effective focal length of the first lens.

3. The imaging lens system as claimed in claim 1, wherein the imaging lens system meets the following expression:

$$0.08 \leq f_3/f_2 \leq 1;$$

where $f_2$ represents an effective focal length of the second lens, and $f_3$ represents an effective focal length of the third lens.

4. The imaging lens system as claimed in claim 1, wherein the imaging lens system meets the following expression:

$$-0.3 \leq (SAG_{11}-SAG_{12})/(SAG_{42}-SAG_{41}) \leq 0.7;$$

where $SAG_{11}$ represents a sagittal depth of the object side surface of the first lens, $SAG_{12}$ represents a sagittal depth of an image side surface of the first lens, $SAG_{41}$ represents a sagittal depth of an object side surface of the fourth lens, and $SAG_{42}$ represents a sagittal depth of the image side surface of the fourth lens.

5. The imaging lens system as claimed in claim 1, wherein the imaging lens system meets the following expression:

$$(ND_4-ND_3)/(VD_4-VD_3)<0$$

where $ND_4$ represents a refractive index of the fourth lens, $ND_3$ represents a refractive index of the third lens, $VD_4$ represents an abbe number of the fourth lens, and $VD_3$ represents an abbe number of the third lens.

6. The imaging lens system as claimed in claim 1, wherein the imaging lens system meets the following expression:

$$-0.43 \text{ mm} \leq SAG_{22}-SAG_{21} \leq -0.21 \text{ mm};$$

where $SAG_{22}$ represents a sagittal depth of an image side surface of the second lens, and $SAG_{21}$ represents a sagittal depth of an object side surface of the second lens.

7. The imaging lens system as claimed in claim 1, wherein the imaging lens system meets the following expression:

$$-0.1 \leq (R_{32}-R_{22})/(R_{31}-R_{21}) \leq 138;$$

where $R_{32}$ represents a radius of curvature of the image side surface of the third lens, $R_{22}$ represents a radius of curvature of an image side surface of the second lens, $R_{31}$ represents a radius of curvature of an object side surface of the third lens, and $R_{21}$ represents a radius of curvature of an object side surface of the second lens.

8. The imaging lens system as claimed in claim 1, wherein each lens is an aspherical lens.

9. The imaging lens system as claimed in claim 1, wherein the imaging lens system further comprises a stop disposed between the first lens and the second lens.

10. The imaging lens system as claimed in claim 1, wherein an image side surface of the first lens is concave, a paraxial region of an object side surface of the third lens is convex, an image side surface of the third lens is convex;
wherein an object side surface of the fourth lens comprises a paraxial region and a peripheral region; and
wherein in the object side surface of the fourth lens, at least one inflection point is defined between the paraxial region of the fourth lens and the peripheral region of the fourth lens, and the paraxial region of the fourth lens is convex relative to the at least one inflection point, and the peripheral region of the fourth lens is concave to the object side.

11. The imaging lens system as claimed in claim 1, wherein an abbe number of the fourth lens is smaller than each of abbe numbers of the first lens, the second lens, and the third lens, and a refractive index of the fourth lens is larger than each of refractive indexes of the first lens, the second lens, and the third lens.

12. A camera module, comprising an imaging lens system and an image sensor opposite to the imaging lens system, from an object side to an imaging side, the imaging lens system comprising:
a first lens with a negative focal power, wherein an image side surface of the first lens is concave and an object side surface of the first lens comprises a paraxial region and a peripheral region; wherein in the object side surface of the first lens, at least one inflection point is defined between the paraxial region and the peripheral region, and the paraxial region is concave relative to the at least one inflection point;
a second lens with a positive focal power;
a third lens with a positive focal power, an image side surface of the third lens being convex;
a fourth lens with a negative focal power, wherein a paraxial region of an image side surface of the fourth lens is concave, and an object side surface of the fourth lens comprises a paraxial region and a peripheral region; wherein in the object side surface of the fourth lens, at least one inflection point is defined between the paraxial region of the fourth lens and the peripheral region of the fourth lens, the paraxial region of the fourth lens is convex relative to the at least one inflection point, and the peripheral region of the fourth lens is concave to the object side; and
wherein the imaging lens system meets the following expression:

$$-0.3 \leq (SAG_{11}-SAG_{12})/(SAG_{42}-SAG_{41}) \leq 0.7;$$

where $SAG_{11}$ represents a sagittal depth of the object side surface of the first lens, $SAG_{12}$ represents a sagittal depth of an image side surface of the first lens, $SAG_{41}$ represents a sagittal depth of an object side surface of the fourth lens, and $SAG_{42}$ represents a sagittal depth of the image side surface of the fourth lens.

13. The camera module as claimed in claim 12, wherein the imaging lens system meets the following expression:

$$-9 \leq f_1/f \leq -1.5;$$

where f represents a focal length of the imaging lens system, and $f_1$ represents an effective focal length of the first lens.

14. The camera module as claimed in claim 12, wherein the imaging lens system meets the following expression:

$$0.08 \leq f_3/f_2 \leq 1;$$

where $f_2$ represents an effective focal length of the second lens, and $f_3$ represents an effective focal length of the third lens.

15. The camera module as claimed in claim 12, wherein the imaging lens system meets the following expression:

$$Rdf_{0.7} \leq 22°;$$

where $Rdf_{0.7}$ represents an angle at which lights of 0.7 field pass through an object side surface of the fourth lens.

16. The camera module as claimed in claim 12, wherein the imaging lens system meets the following expression:

$$-0.43 \text{ mm} \leq SAG_{22}-SAG_{21} \leq -0.21 \text{ mm};$$

where $SAG_{22}$ represents a sagittal depth of an image side surface of the second lens, and $SAG_{21}$ represents a sagittal depth of an object side surface of the second lens.

17. The camera module as claimed in claim 12, wherein the imaging lens system meets the following expression:

$$-0.1 \leq (R_{32}-R_{22})/(R_{31}-R_{21}) \leq 138;$$

where $R_{32}$ represents a radius of curvature of the image side surface of the third lens, $R_{22}$ represents a radius of curvature of an image side surface of the second lens, $R_{31}$ represents a radius of curvature of an object side surface of the third lens, and $R_{21}$ represents a radius of curvature of an object side surface of the second lens.

18. The camera module as claimed in claim 12, wherein each lens of the imaging lens system is an aspherical lens.

19. An electronic device, comprising a camera module, a memory and a processor, the memory and the camera module being electrically connected with the processor, the memory being configured to store image data, the processor being configured to process the image data, the camera module comprising an imaging lens system and an image sensor, the image sensor being opposite to the imaging lens system and configured to sense and generate the image data, the imaging lens system sequentially comprising:
a first lens with a negative focal power, wherein an image side surface of the first lens is concave and an object side surface of the first lens comprises a paraxial region and a peripheral region; wherein in the object side surface of the first lens, at least one inflection point is defined between the paraxial region and the peripheral region, and the paraxial region is concave relative to the at least one inflection point;
a second lens with a positive focal power;
a third lens with a positive focal power, an image side surface of the third lens being convex;
a fourth lens with a negative focal power, wherein a paraxial region of an image side surface of the fourth lens is concave, and an object side surface of the fourth lens comprises a paraxial region and a peripheral region; wherein in the object side surface of the fourth lens, at least one inflection point is defined between the paraxial region of the fourth lens and the peripheral region of the fourth lens, the paraxial region of the fourth lens is convex relative to the at least one inflection point, and the peripheral region of the fourth lens is concave to the object side; and wherein the imaging lens system meets the following expression:

$$-0.43\ mm \leq SAG_{22} - SAG_{21} \leq -0.21\ mm;$$

where $SAG_{22}$ represents a sagittal depth of an image side surface of the second lens, and $SAG_{21}$ represents a sagittal depth of an object side surface of the second lens.

20. The electronic device as claimed in claim 19, wherein the imaging lens system meets the following expression:

$$Rdf_{0.7} \leq 22°;$$

where $Rdf_{0.7}$ represents an angle at which lights of 0.7 field pass through an object side surface of the fourth lens.

* * * * *